United States Patent
Koyama

(10) Patent No.: US 6,917,744 B2
(45) Date of Patent: Jul. 12, 2005

(54) OPTICAL MULTIPLEXING AND DEMULTIPLEXING DEVICE, OPTICAL COMMUNICATION APPARATUS, AND OPTICAL COMMUNICATION SYSTEM

(75) Inventor: Tomoko Koyama, Hara-mura (JP)

(73) Assignee: Seiko Epson Corporation, Tokyo (JP)

(*) Notice: Subject to any disclaimer, the term of this patent is extended or adjusted under 35 U.S.C. 154(b) by 232 days.

(21) Appl. No.: 10/449,495

(22) Filed: Jun. 2, 2003

(65) Prior Publication Data
US 2003/0231884 A1 Dec. 18, 2003

(30) Foreign Application Priority Data
Jun. 6, 2002 (JP) .................................. 2002-165703

(51) Int. Cl.[7] .......................... H04J 14/02; G02B 6/10
(52) U.S. Cl. ...................... 385/131; 385/130; 385/129; 398/48; 398/68
(58) Field of Search ...................... 385/14, 129–131; 398/43, 48–51, 68

(56) References Cited

U.S. PATENT DOCUMENTS

| 5,684,817 A | 11/1997 | Houdre et al. |
| 6,416,575 B2 * | 7/2002 | Yamada ............................ 117/2 |
| 6,738,551 B2 * | 5/2004 | Noda et al. .................. 385/130 |

FOREIGN PATENT DOCUMENTS

| JP | A 2001-272555 | 10/2001 |
| JP | A 2001-022981 | 1/2002 |
| JP | A 2002-258079 | 9/2002 |

* cited by examiner

*Primary Examiner*—Ellen E. Kim
*Assistant Examiner*—Kevin S. Wood
(74) *Attorney, Agent, or Firm*—Oliff & Berridge, PLC

(57) ABSTRACT

The invention provides an optical multiplexing and demultiplexing device using a two-dimensional photonic crystal, in which miniaturization and higher integration thereof can be achieved; an optical communication apparatus; and an optical communication system. The optical multiplexing and demultiplexing device of the present invention includes a substrate; and a plurality of slab layers provided on the substrate. The slab layers each have a two-dimensional photonic crystal structure, in which low refractive index regions are periodically arranged. In addition, the slab layers have line defects, provided in part of the periodical arrangement so as to function as a waveguide, and at least point defects formed in the respective periodic arrangements, the point defects capturing light having a specific wavelength and introducing it to the line defects or capturing light having a specific wavelength from the line defects and radiating it. The point defects, which capture light having the same wavelength, provided in the slab layers are disposed so as to oppose each other.

11 Claims, 16 Drawing Sheets

(A)

(B)

(A)

(B)

(A)

(B)

(A)

(B)

(A)

(B)

(A)

(B)

(A)

(B)

(A)

(B)

(A)

(B)

(A)

(B)

OPTICAL MULTIPLEXING AND DEMULTIPLEXING DEVICE, OPTICAL COMMUNICATION APPARATUS, AND OPTICAL COMMUNICATION SYSTEM

BACKGROUND OF THE INVENTION

1. Field of Invention

The present invention relates to optical multiplexing and demultiplexing devices using a two-dimensional photonic crystal structure, optical communication apparatuses, and optical communication systems.

2. Description of Related Art

Increasing the capacity of communication systems can be advantageous. Thus, the related art includes optical products using a wavelength division multiplexing (WDM) method in which a large amount of information can be multiplexed on a predetermined optical wavelength band and can then be transmitted through optical fibers. In particular, an optical multiplexing and demultiplexing device (referred to as an optical branching and inserting device or an optical add-drop multiplexer in some cases), in which a predetermined signal can be extracted from a multiplexed signal or in which a signal can be added to form a multiplexed signal, can be considered in the related art to be a key device among optical components used for the wavelength division multiplexing system described above.

The related art includes various types of the above optical multiplexing and demultiplexing device, for example, an array waveguide diffraction lattice type, a fiber grating type, and a photonic crystal type. One such optical multiplexing and demultiplexing device is disclosed in Japanese Unexamined Patent application Publication No. 2001-272555. The disclosed device uses a two-dimensional photonic crystal which has a periodic refractive-index distribution structure on a two-dimensional plane, and due to superior wavelength selectivity thereof, this device can be advantageous.

SUMMARY OF THE INVENTION

In addition, when a related art optical multiplexing and demultiplexing device processes a large amount of optical information, optical multiplexing or demultiplexing is performed on a two-dimensional plane, and as a result, the size of the plane structure inevitably becomes larger. Accordingly, in order to construct a highly integrated system, miniaturizations of individual optical components can be expected.

The present invention provides an optical multiplexing and demultiplexing device which uses a two-dimensional photonic crystal and in which the degree of integration of the device can be enhanced; an optical communication apparatus; and an optical communication system.

An optical multiplexing and demultiplexing device of the present invention includes a substrate; and a plurality of slab layers provided on the substrate. Each of the slab layers has a two-dimensional photonic crystal structure, in which low refractive index regions are periodically arranged, and includes a line defect functioning as a waveguide formed in part of the periodical arrangement and at least one point defect formed in the periodic arrangement, in which the point defect captures light having a specific wavelength and introduces it into the line defect or captures light having a specific wavelength from the line defect and radiates it. The point defects provided in at least two of the slab layers, which capture light having the same wavelength, are disposed so as to oppose each other.

In this specification, the meaning of "on something" includes "above something with a predetermined layer provided therebetween" in addition to "directly on something".

In the optical multiplexing and demultiplexing device according to the present invention, each of said plurality of slab layers provided on the substrate forms a slab type waveguide having a two-dimensional photonic crystal structure. In each of the slab layers, the line defect formed in part of the periodic arrangement of the low refractive index regions serves as a waveguide to guide light. In addition, in the optical multiplexing and demultiplexing device according to the present invention, for example, in this periodic arrangement, the point defect may be disposed in the vicinity of the line defect. By using the disordered portion in the periodic arrangement described above, this point defect has functions in which light having a specific wavelength is captured from the outside of the slab layer and is then introduced into the line defect, and in which light passing through the line defect is captured and is then radiated outside the slab layer.

In addition, in the optical multiplexing and demultiplexing device described above, point defects provided in at least two slab layers, which capture light having the same wavelength, are disposed so as to oppose each other. Accordingly, light having a specific wavelength, that is, one component of an optical signal incident on one end surface of a predetermined slab layer, is radiated from one point defect provided in the slab layer mentioned above to the other slab layer, and this light radiated to the other slab layer is introduced into a line defect from the other point defect formed therein. Hence, between a plurality of the slab layers, demultiplexing or multiplexing of light can be performed, and as a result, demultiplexed light or multiplexed light can be emitted from a desired slab layer.

Hence, according to the present invention, since demultiplexed light or multiplexed light obtained by a plurality of slab layers laminated to each other can be emitted, a compact and highly integrated optical multiplexing and demultiplexing device can be realized. In addition, for example, in the case in which light is emitted from one end surface of each of the slab layers, the optical multiplexing and demultiplexing device of the present invention can sufficiently ensure connection capability for connection with other devices such as optical fibers used as pathways while the integration thereof is enhanced.

The optical multiplexing and demultiplexing device of the present invention may have the structure as described below.

The point defect may selectively have a different shape in accordance with a wavelength of light which is to be captured.

Accordingly to the structure described above, by forming point defects having various shapes in the individual slab layers, demultiplexing and multiplexing may be performed for light having a desired wavelength.

In this specification, when "different shape" is described for the point defect, in addition to the case in which the plane shape of the point defect is different, the case in which the size of the point defect is different is also included.

The point defect described above may be formed so as to have a columnar structure asymmetry in the longitudinal direction.

According to the structure described above, the loss generated by leakage of light captured in the point defect, which occurs when the light is radiated therefrom or introduced, can be reduced or prevented, and hence the light thus captured can be transmitted to another slab layer with a small loss.

A reflection member to reflect the light having the specific wavelength described above to a surface of the slab layer described above may be disposed at one side of the point defect.

Accordingly to the structure described above, the loss generated when the light captured in the point defect is radiated or introduced can also be prevented by reflection, and hence the captured light can be transmitted to a point defect formed in another slab layer with a small loss.

Clad layers having a refractive index lower than that of the slab layers may be formed on the top and the bottom of each slab layer.

According to the structure described above, by the clad layers, light can be reliably confined in the line defects also in the direction perpendicular to the surfaces of the slab layers.

Support layers may be provided between the slab layers and between the substrate and one of the slab layers.

According to the structure described above, a hollow structure can be realized in which the clad layers are formed, for example, of air. In addition, according to the hollow structure described above, since a manufacturing process dependence of the refractive index of the clad layer can be decreased, and a stable refractive index can be obtained thereby, optical multiplexing or optical demultiplexing can be reliably performed for light having a specific wavelength.

The line defect may be closed at one end thereof by the periodic arrangement of the low refractive index regions.

According to the structure described above, since the light can be controlled to be emitted from one end surface side of the slab layer, demultiplexed/multiplexed light can be emitted with a small loss.

The line defect of one of the slab layers may be disposed so as not to overlap another line defect of at least one of the slab layers provided above and below the one of the slab layers.

According to this structure described above, the interference between waveguides caused by the line defects can be reduced or prevented, and in addition, miniaturization can be further performed by decreasing the distance between the slab layers.

The periodic arrangement may be a triangular lattice arrangement or a square lattice arrangement.

The low refractive regions may be grooves or through-holes formed in the slab layers.

In addition, the optical multiplexing and demultiplexing device of the present invention can be applied to an optical communication apparatus and an optical communication system.

DETAILED DESCRIPTION OF PREFERRED EMBODIMENTS

Exemplary embodiments of the present invention are described below with reference to figures.

[First Exemplary Embodiment]

(Exemplary Structure of the Device)

Figure 1:
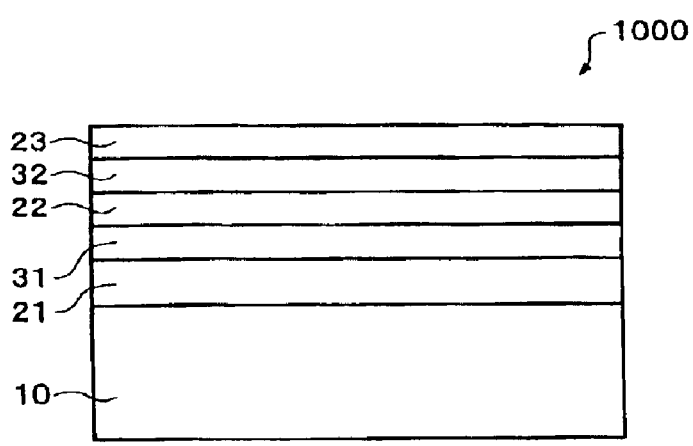
FIG. 1 is a schematic cross-sectional view showing an optical multiplexing and demultiplexing device of an exemplary embodiment according to the present invention.

FIG. 1 is a schematic cross-sectional view showing an optical multiplexing and demultiplexing device 1000 of an exemplary embodiment according to the present invention.

The optical multiplexing and demultiplexing device 1000 is composed of slab layers 31 and 32 formed above a substrate 10 with clad layers 21, 22, and 23 provided therebetween.

As a material for the substrate 10, for example, there may be provided a semiconductor substrate, such as a Si substrate, an SOI substrate containing $SiO_2$ and Si provided sequentially on a Si substrate, a SiC substrate, a GaAs substrate, or an InP substrate; a glass substrate; or a resin substrate.

The clad layers 21, 22, and 23 are formed of a material having a refractive index lower than that of the slab layers 31 and 32 and have a function of confining light in the slab layers 31 and 32 in the direction perpendicular to the surfaces thereof. A material for the clad layers 21, 22, and 23 is determined in combination with the refractive index of a material for the slab layers 31 and 32. For example, there may be provided an inorganic material, such as In, Ga, Al, Sb, As, Ge, Si, P, N, O, or an optional combination thereof, and more particularly, $SiO_2$, $SiN_x$, $SiO_xN_y$, AlGaAs, AlGaAsSb, InGaP, InP, or the like may be provided. In addition to those mentioned above, as the material for the clad layers 21, 22, and 23, for example, there may be provided a gas such as air, or an organic material, such as polymethyl methacrylate (PMMA), an epoxy resin, a phenolic resin, dially phthalate, phenyl methacrylate, or a fluorinated polymer.

Figure 2:
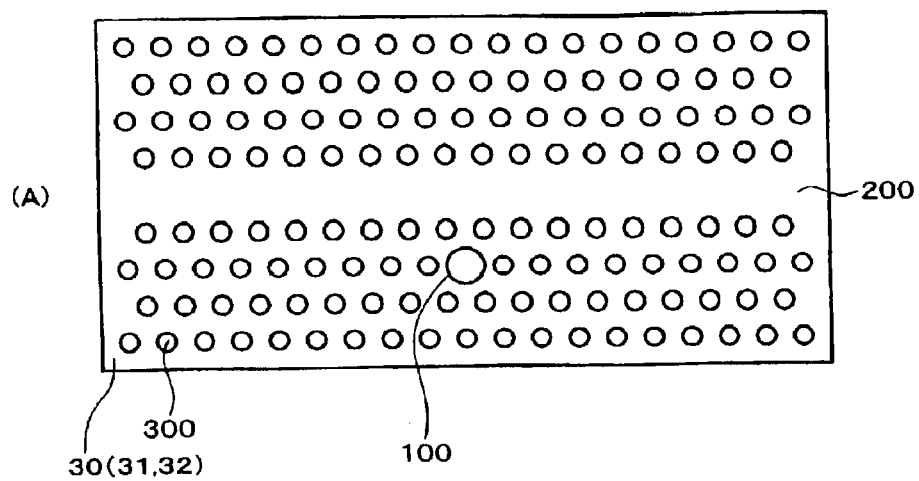
FIGS. 2(A) and 2(B) are schematic plan views each showing a slab layer of an optical multiplexing and demultiplexing device of an exemplary embodiment of the present invention.
Figure 2:
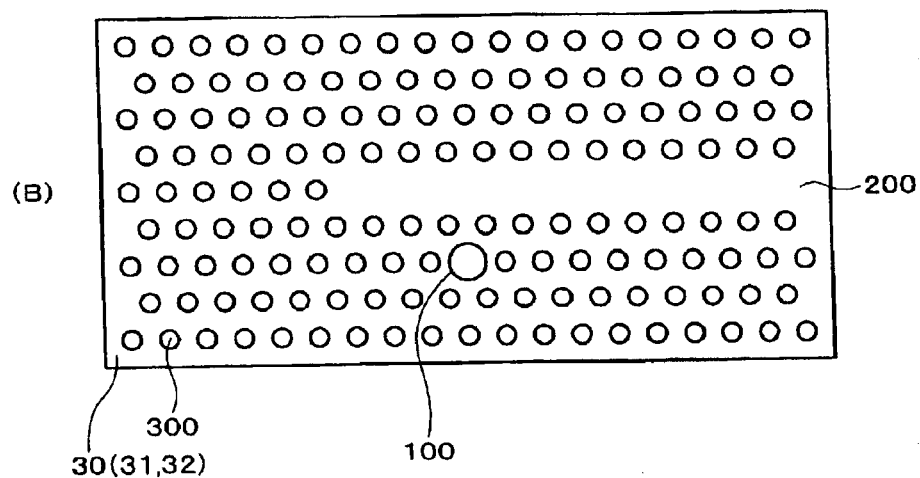

As shown in FIG. 2(A), the slab layers 31 and 32 each form a slab type waveguide having a two-dimensional photonic crystal structure. The two-dimensional photonic crystal structure is the structure in which a band gap is present in a two-dimensional plane by periodically arranging regions (hereinafter "low refractive index regions") 300 having a different refractive index.

The low refractive index regions 300 are formed of grooves or through-holes provided in the slab layers 31 and 32 filled with a medium, such as air, the medium having a refractive index lower than that of the slab layers 31 and 32. In addition, the material for the clad layers 21, 22, and 23 may be filled in the through-holes or the grooves described above in some cases. The same thing can be applied to the point defects 100 described below.

In the two-dimensional photonic crystal structure, the propagation of light in an in-plane direction is forbidden by the presence of the band gap described above. In addition, in the slab layers 31 and 32, line defects 200 are provided each having the structure formed as if part of the low refractive index regions 300, which are periodically arranged in the two-dimensional photonic crystal structure, is removed. Hence, the line defect 200 functions as a slab type waveguide in which light is propagated only in this line defect 200. Because of the difference in refractive index between the slab layers 31 and 32 and the clad layers 21, 22, and 23, light which passes through the line defects 200 of the slab layers 31 and 32 is propagated while being confined in the line defects 200 in the direction perpendicular to the surfaces of the slab layers.

In addition, in the slab layers 31 and 32, as shown in FIG. 2(B), the periodic arrangement of the low refractive index regions 300 may close one end portion of the line defect 200. According to the structure described above, in the case in which the slab layers 31 and 32 are only used to receive or emit light, light can be propagated while the loss generated by isotropic light emission performed from the two end portions of the line defect 200 is decreased. In addition, due to the structure described above, the direction of light incident on and emitted from the slab layers 31 and 32 can be controlled.

In the slab layers 31 and 32, a plane shape of the low refractive index region 300 is not limited to the circular shape shown in FIG. 2(A) and may be a polygonal shape, such as a tetragonal or hexagonal shape.

Figure 3:
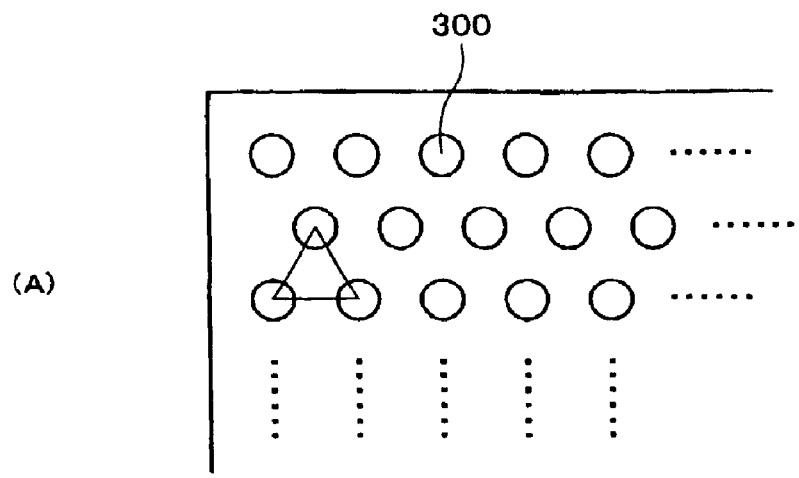
FIGS. 3(A) and 3(B) are schematics each illustrating the arrangement of low refractive index regions of an optical multiplexing and demultiplexing device of an exemplary embodiment according to the present invention.
Figure 3:
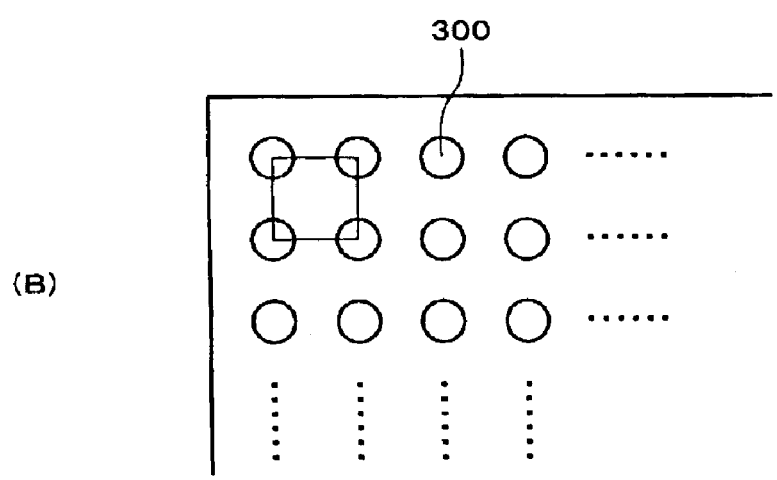

In addition, in the slab layers 31 and 32 of the optical multiplexing and demultiplexing device 1000, as shown in FIG. 3(A) or 3(B), the low refractive index regions 300 may form a periodic arrangement of a triangular lattice or a square lattice.

In the slab layers 31 and 32, a point defect 100 having a shape different from that of the low refractive index region 300 may be formed in the periodic arrangement of the low refractive index regions 300, so that light having a specific wavelength can be demultiplexed or multiplexed. That is, among light passing through the line defect 200, light having a specific wavelength is captured by this point defect 100 and is radiated outside the slab layers 31 and 32, and light having a specific wavelength incident from the outside is captured by the point defect 100 and is then introduced into the line defect 200.

When this point defect 100 is formed so that the shape thereof, such as a size or a plane structure, is different from that of the low refractive index region 300, light having a specific wavelength corresponding to the shape described above can be captured, and hence the point defect 100 serves as a radiation port for radiating light outside and a receiving port for receiving light from the outside. For example, when the low refractive index region 300 is formed to have a circular plane shape, the point defect 100 may be formed to have a plane shape having a radius (or a diameter) deferent from that mentioned above.

That is, in the optical multiplexing and demultiplexing device 1000 of this exemplary embodiment, by using the structure described above, when point defects 100 having various shapes are formed in the slab layer 30, various types of light, each having a wavelength corresponding to each of the shapes mentioned above, can be captured and can then be demultiplexed or multiplexed.

In addition, by filling a material having a different refractive index in the point defect 100, the slab layer 30 can be formed so that light having a different wavelength is captured. In this case, the wavelength of light captured by the point defect 100 varies in accordance with the size or plane structure thereof as described above. Hence, when the material filled in the point defect 100 has a different refractive index, the effective shape of the point defect 100 is changed, and as a result, light having a different wavelength can be captured. In the case described above, when a material having a refractive index easily changeable with the change in temperature is used as the material filled in the point defect 100, by performing temperature control of the optical multiplexing and demultiplexing device 1000 using a temperature regulator, the wavelength of light captured by the point defect 100 can also be changed in accordance with the temperature control performed when the optical multiplexing and demultiplexing device 1000 is used. In the optical multiplexing and demultiplexing device 1000 of this exemplary embodiment, by appropriately changing the size of the point defect 100 in the slab layer 30 and the filling material, the point defect 100 can be formed so as to capture light having a desired wavelength.

Figure 4:
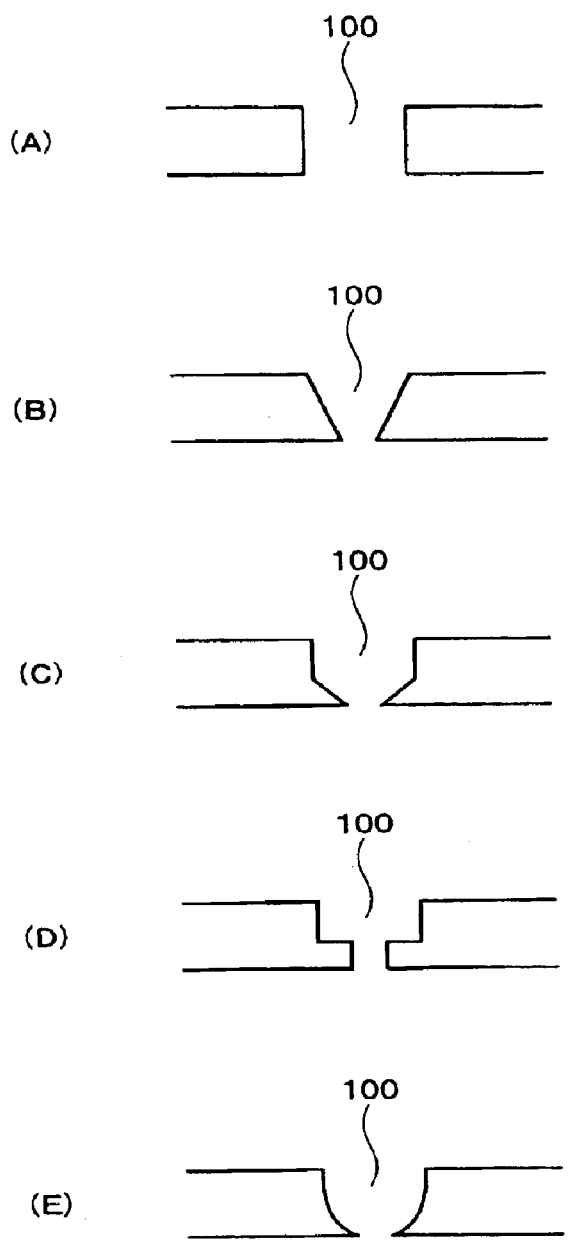
FIGS. 4(A) to 4(E) are schematics each illustrating a cross-sectional shape of a point defect of an optical multiplexing and demultiplexing device of an exemplary embodiment according to the present invention.

In addition, for example, as shown in FIG. 4(A), the shape of the point defect 100 may be formed into a columnar structure. When light is radiated outside, and for example, the point defect 100 has a symmetric columnar structure in the longitudinal direction as shown in FIG. 4(A), captured light is isotropically radiated from the top and the bottom sides. Accordingly, by the use of this type of shape described above, for example, in top and bottom layers provided on both sides of the slab layer 30, demultiplexed light can also be used.

In the case in which the direction of light radiated from the point defect 100 is controlled, when a shape asymmetric in the longitudinal direction as shown in FIGS. 4(B) to 4(E) is used, since light is primarily radiated from the side which is widely opened, the loss of the radiated light can be significantly reduced.

In addition, even when the shape of the point defect 100 is, for example, a columnar structure symmetric in the longitudinal direction as shown in FIG. 4(A), by providing a light reflection member (not shown in the figure) at one side of the opening portion, light isotropically radiated can be prevented from being leaked in directions except for a desired direction by the light reflection member described above. According to the structure described above, since the loss generated when light captured in the point defect 100 is radiated or introduced can be prevented by reflection, the captured light can be propagated with a small loss.

In addition, as a material for the slab layers 31 and 32, for example, there may be used an inorganic material composed of In, Ga, Al, Sb, As, Ge, Si, P, N, O, or the optional combination thereof and having a refractive index higher than that of the clad layers 21, 22, and 23. In particular, Si, SiO2 containing an impurity, such as Ge, AlAs, GaAs, InGaAs, GaAsSb, InGaAsP, or the like may be provided. In addition, as the material for the slab layers 31 and 32, for example, an organic material, such as polymethyl methacrylate (PMMA), an epoxy resin, a phenolic resin, dially phthalate, phenyl methacrylate, or a fluorinated polymer, having a refractive index higher than that of the clad layers 21, 22, and 23 may be used.

(Exemplary Functions of the Device)

Figure 5:
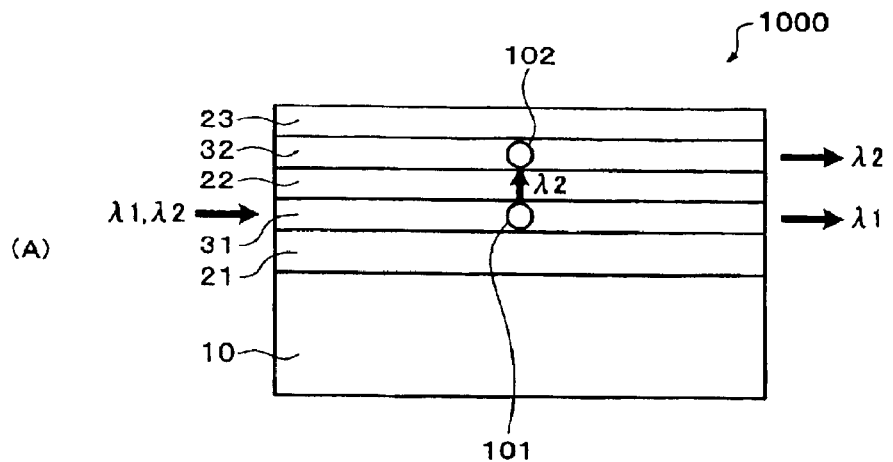
FIG. 5(A) is a schematic illustrating an optical demultiplexing function of an optical multiplexing and demultiplexing device of an exemplary embodiment according to the present invention.
FIG. 5(B) is a schematic illustrating an optical multiplexing function of an optical multiplexing and demultiplexing device of the first exemplary embodiment according to the present invention.
Figure 5:
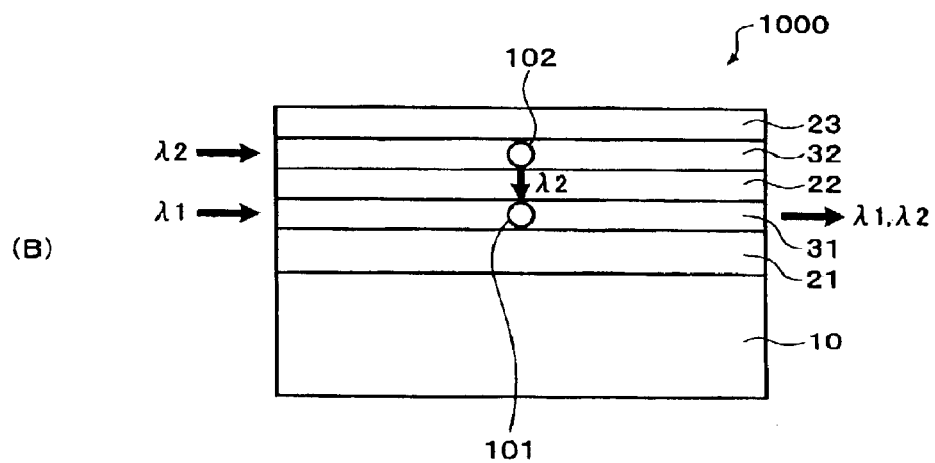
Figure 6:
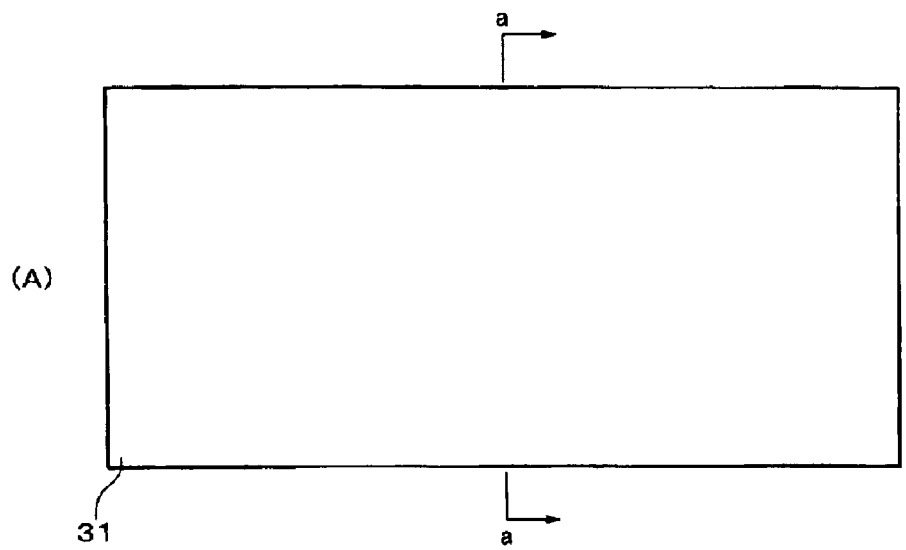
FIGS. 6(A) and 6(B) are schematics each showing one manufacturing step of an optical multiplexing and demultiplexing device of an exemplary embodiment according to the present invention.
Figure 6:
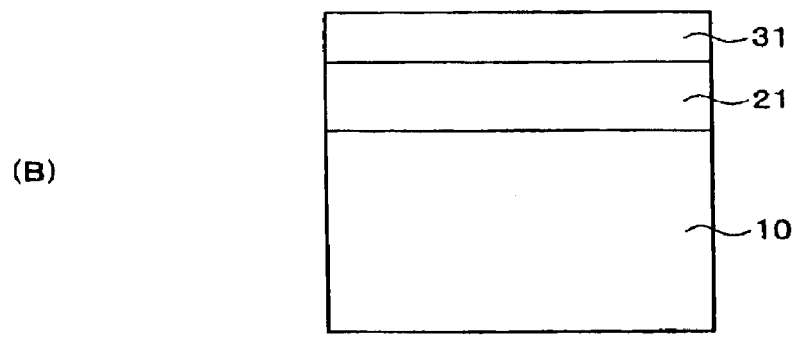
Figure 7:
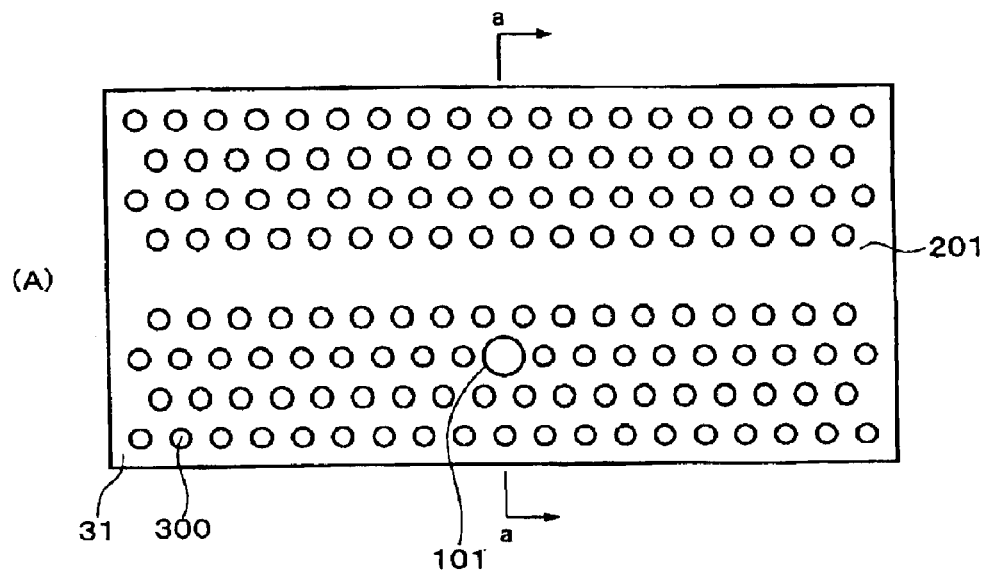
FIGS. 7(A) and 7(B) are schematics each showing one manufacturing step of an optical multiplexing and demultiplexing device of an exemplary embodiment according to the present invention.
Figure 7:
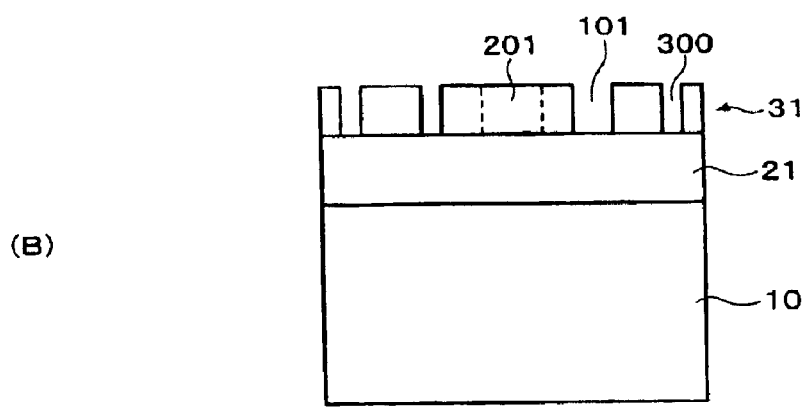
Figure 8:
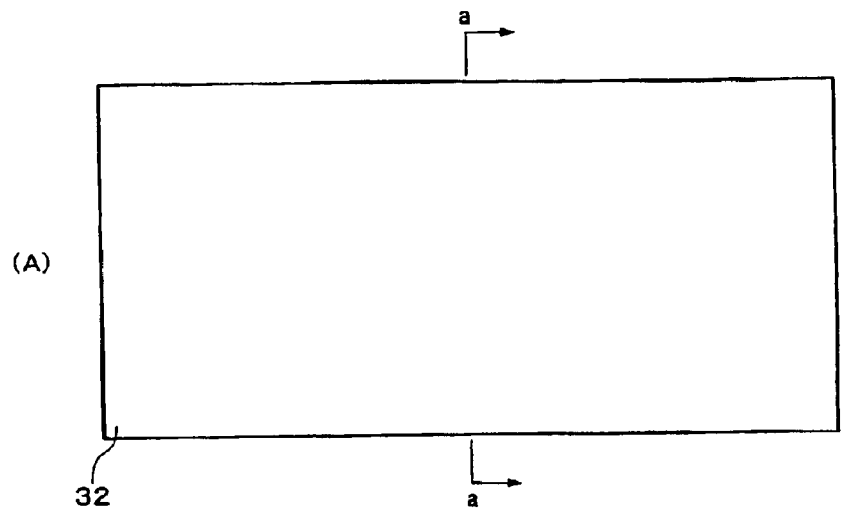
FIGS. 8(A) and 8(B) are schematics each showing one manufacturing step of an optical multiplexing and demultiplexing device of an exemplary embodiment according to the present invention.
Figure 8:
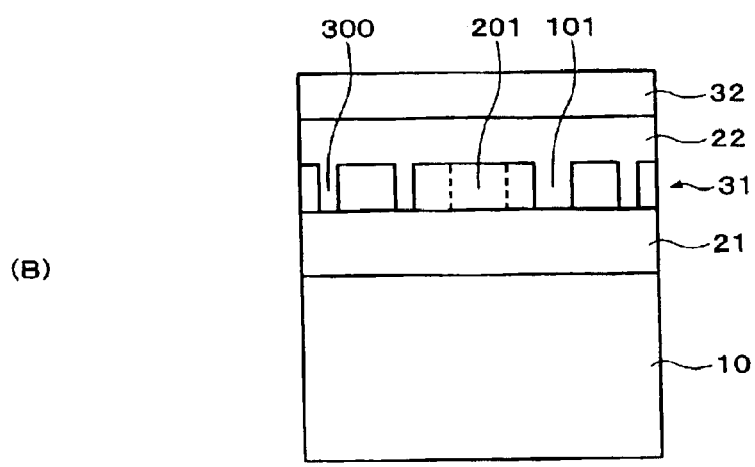
Figure 9:
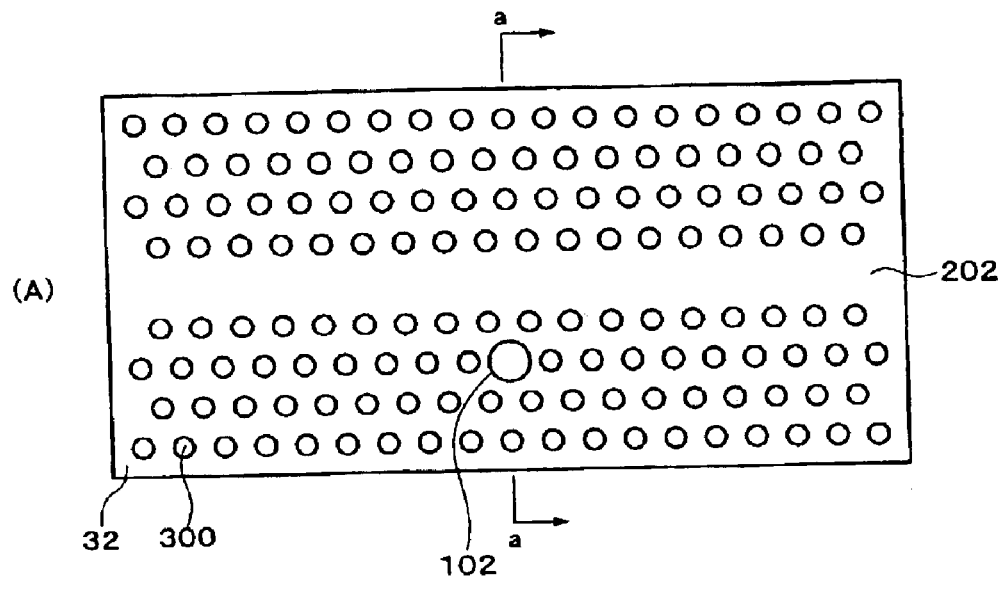
FIGS. 9(A) and 9(B) are schematics each showing one manufacturing step of an optical multiplexing and demultiplexing device of an exemplary embodiment according to the present invention.
Figure 9:
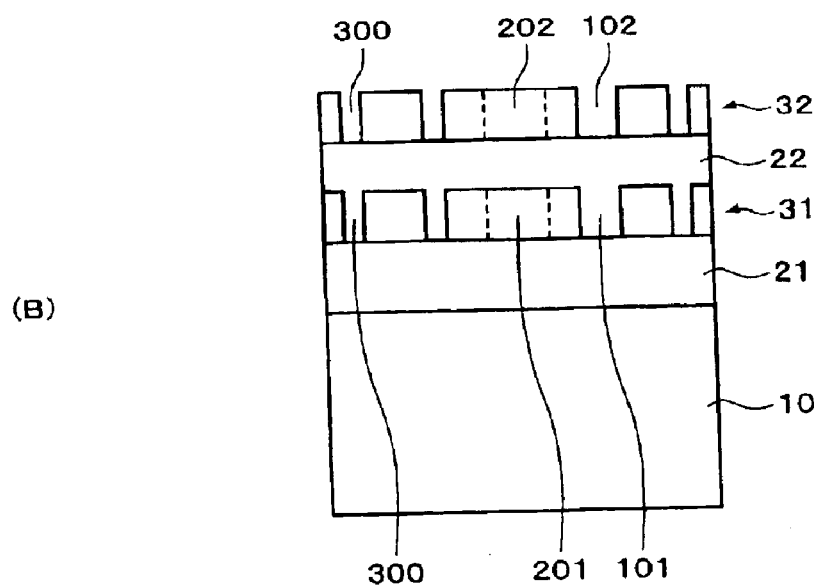
Figure 10:
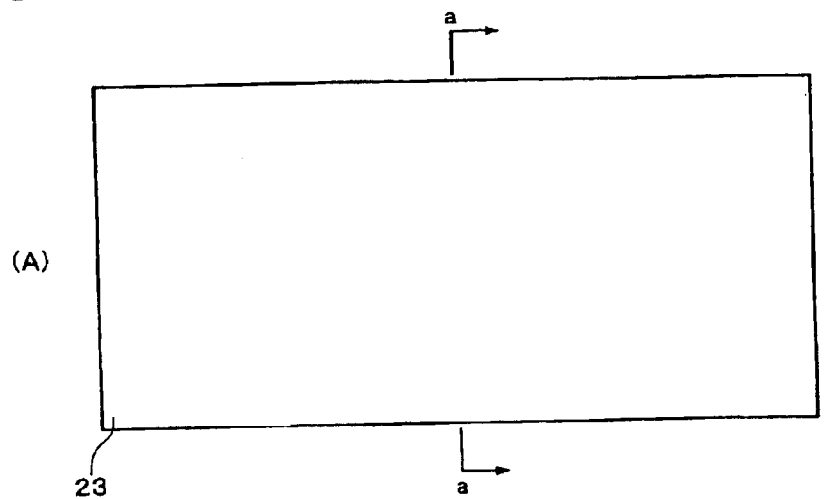
FIGS. 10(A) and 10(B) are schematics each showing one manufacturing step of an optical multiplexing and demultiplexing device of an exemplary embodiment according to the present invention.
Figure 10:
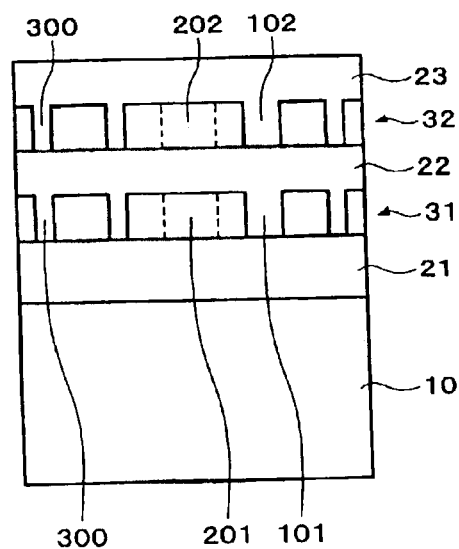

Next, referring to FIGS. 5(A) and 5(B), an optical demultiplexing function and an optical multiplexing function of the optical multiplexing and demultiplexing device 1000 are described below.

First, as shown in FIG. 5(A), when light including a plurality of wavelengths λ1 and λ2 is incident on the line defect from one end surface of the slab layer 31, among light passing through the line defect, light having the wavelength λ2 is captured in a point defect 101 in the slab layer 31 and is then radiated outside. Light having the wavelength λ1 passes through the line defect of the slab layer 31 and is then emitted from the other end surface.

Next, the light having the wavelength λ2 radiated outside is introduced into the line defect of the slab layer 32 from a point defect 102 therein through the clad layer 22 having a low refractive index. Subsequently, the light having the wavelength λ2 introduced into the line defect of the slab layer 32 from the point defect 102 is emitted from one end surface of the slab layer 32.

That is, in the optical multiplexing and demultiplexing device 1000 of this exemplary embodiment, by the effects of the point defects 101 and 102, capturing light having a specific wavelength, from the light including the wavelengths λ1 and λ2 incident from one end surface of the slab layer 31, the light having the wavelength λ1 is emitted from the end surface of the slab layer 31, and the light having the wavelength λ2 is emitted from one end surface of the slab layer 32; hence, the light is demultiplexed.

Next, as shown in FIG. 5(B), the case is assumed in which light having the wavelength λ1 and light having the wavelength λ2 enter end surfaces of the slab layer 31 and the slab layer 32, respectively.

In the case described above, the light having the wavelength λ1 incident on the slab layer 31 is not captured by the point defect 101 therein and passes through the line defect of the slab layer 31. In addition, the light having the wavelength λ2 incident on the slab layer 32 is captured by the point defect 102 therein and is then radiated outside, and the light thus radiated is captured by the point defect 101 through the clad layer 22 and is then introduced into the line defect of the slab layer 31. Subsequently, light including the wavelengths λ1 and λ2 is emitted from the end portion of the slab layer 31 through the line defect thereof.

That is, in the optical multiplexing and demultiplexing device 1000 of this exemplary embodiment, by the effects of the point defects 101 and 102, capturing light having a specific wavelength, the light having the wavelength λ1 and the light having the wavelength λ2, which are incident on the end surfaces of the slab layer 31 and the slab layer 32, respectively, can be multiplexed in the line defect of the slab layer 31, and this multiplexed light is then emitted from the end surface of the slab layer 31.

As described above, according to the optical multiplexing and demultiplexing device 1000 of this exemplary embodiment, since the light having the wavelength λ1 and the light having the wavelength λ2, which are demultiplexed in the plurality of the slab layers 31 and 32 forming a multilayer structure, can be emitted from the end surfaces of the slab layers 31 and 32, respectively, and the multiplexed light including the wavelengths λ1 and the wavelength λ2 can be emitted from the end surface of the slab layer 31, a highly integrated optical multiplexing and demultiplexing device can be realized while being miniaturized. In addition, in the optical multiplexing and demultiplexing device 1000 of this exemplary embodiment, since light is emitted from and is incident on the end surfaces of the slab layers 31 and 32, the connection capability for connection with other devices such as optical fibers can be sufficiently ensured.

(Exemplary Manufacturing Method of Device)

Next, an example of a method of manufacturing the optical multiplexing and demultiplexing device 1000 described above is described below with reference to FIGS. 6(A) to 10(B). FIGS. 6(B) to 10(B) are cross-sectional views taken along plane a—a of plan views shown in FIGS. 6(A) to 10(A).

(1) First, as shown in FIGS. 6(A) and 6(B), on the substrate 10, the clad layer 21 is formed, and a layer formed into the slab layer 31 is further formed thereon. In particular, as the substrate 10, for example, a synthetic resin substrate is used, and on this substrate 10, the clad layer 21 composed, for example, of an organic material having a low refractive index is formed, for example, by a spin coating method. Next, on the clad layer 21, the slab layer 31 composed of an organic material having a refractive index higher than that of the clad layer 21 may be formed, for example, by a spin coating method.

(2) Next, as shown in FIGS. 7(A) and 7(B), after the slab layer 31 is masked, for example, by a resist or the like (not shown in the figure), the periodic arrangement composed of the low refractive index regions 300 each having a columnar structure and the point defect 101 having a shape different from that of the low refractive index region 300 can be formed by patterning using a related art, later developed or known etching method. The patterning of the low refractive index regions 300 and the point defect 101 may also be performed by a photolithography technique using an exposure apparatus, an electron beam lithography method by EBs (electron beams), or the combination thereof.

In addition, a line defect 201 of the slab layer 31 can be formed by masking a linear part of the slab layer 31 followed by the formation of the low refractive index regions 300 and the point defect 101 by patterning.

(3) Next, as shown in FIGS. 8(A) and 8(B), on the slab layer 31, the clad layer 22 and a layer to be formed into the slab layer 32 are formed in that order. The clad layer 22 can be formed by using the same material and film-forming method as those for the clad layer 21. In addition, the slab layer 32 can be formed by using the same material and film-forming method as those for the slab layer 31.

In the process described above, when having a low viscosity, the material for the clad layer 22 is filled in the low refractive index regions 300 and in the point defect 101. When a material having a high viscosity is used for the clad layer 22, the low refractive index regions 300 and the point defect 101 are not filled therewith, and the structure can be formed in which air, which has a low refractive index, is filled in the low refractive index regions 300 and the point defect 101.

(4) Next, as shown in FIGS. 9(A) and 9(B), the slab layer 32 is patterned so that the periodic arrangement of the low refractive index regions 300, the point defect 102, and a line defect 202 are formed in the same method as that described for the above (2).

In this step, the point defect 102 is formed at a position opposing the point defect 101 formed in the slab layer 31.

(5) Finally, as shown in FIGS. 10(A) and 10(B), on the slab layer 32, the clad layer 23 is formed using the same material and film-forming method as those for the clad layers 21 and 22. In the step described above, the structure may be formed in which a material for the clad layer 23 having a refractive index lower than that of the material for the slab layer 32 is filled in the low refractive index regions 300 and the point defect 102 of the slab 32 or in which air is filled therein.

In this exemplary embodiment, as the film-forming methods for the individual layers in the steps described in the above (1) to (5), preferable methods may be used in accordance with materials which are selected. For example, a known film-forming method, such as a deposition method, a sputtering method, a CVD method (including an MOCVD method), an MBE method, a spin coating method, or an ink-jet method, may be used.

In addition, the optical multiplexing and demultiplexing device 1000 of this exemplary embodiment is not limited to that described above, and the following various exemplary embodiments may also be used.

MODIFIED EXAMPLE 1

Figure 11:
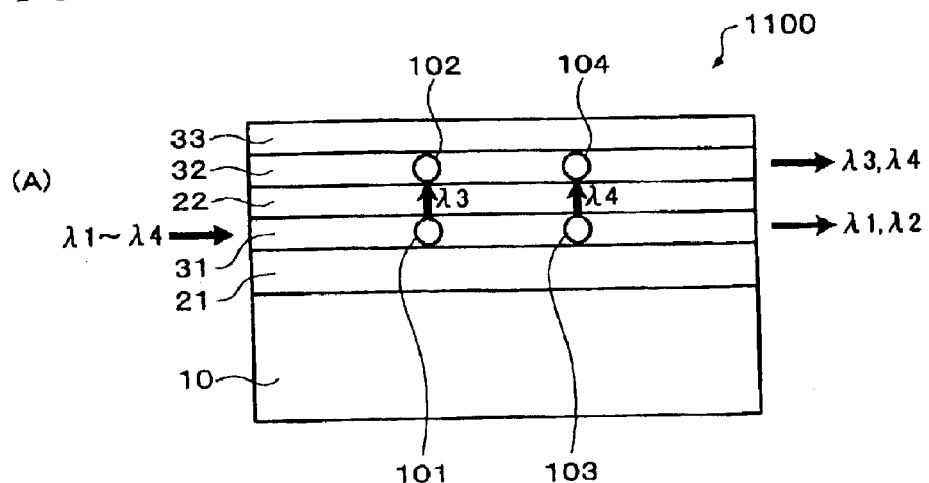
FIG. 11(A) is a schematic showing an optical multiplexing and demultiplexing device of Modified Example 1 of an exemplary embodiment according to the present invention.
FIG. 11(B) is a schematic showing an optical multiplexing and demultiplexing device of Modified Example 2 of an exemplary embodiment according to the present invention.
Figure 11:
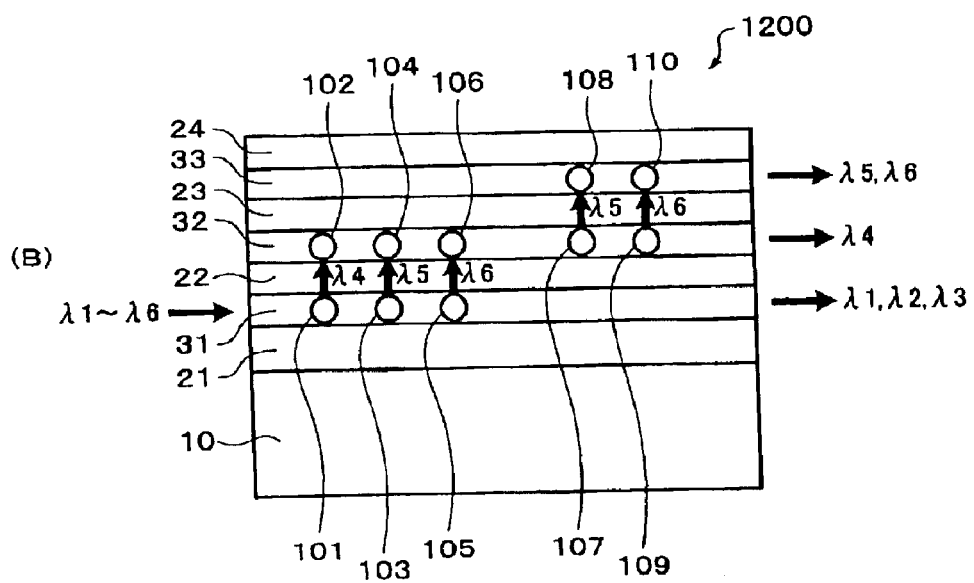

FIG. 11(A) is a schematic cross-sectional view of an optical multiplexing and demultiplexing device 1100 of Modified Example 1 of this exemplary embodiment. The same reference numerals of the members shown in FIGS. 5(A) and 5(B) designate the members having substantially the same functions as those described above, and detailed descriptions thereof are omitted. In addition, as materials for individual layers and film-forming methods of the optical multiplexing and demultiplexing device 1100, the same materials and methods as those for the optical multiplexing and demultiplexing device 1000 of this exemplary embodiment may be selected.

The optical multiplexing and demultiplexing device 1100 shown in FIG. 11(A) is formed so that light including a plurality of specific wavelengths $\lambda 3$ and $\lambda 4$ can be obtained by demultiplexing and is then emitted from the slab layer 32. That is, the point defects 101 and 102 and point defects 103 and 104, capturing the wavelengths $\lambda 3$ and $\lambda 4$, respectively, are formed in the slab layers 31 and 32. The point defects 101 and 102 are formed so as to oppose each other, and the point defects 103 and 104 are formed so as to oppose each other. The point defects 101 to 104 are formed each having a predetermined shape to be able to capture a desired wavelength.

In the optical multiplexing and demultiplexing device 1100 described above, from light including wavelengths $\lambda 1$ to $\lambda 4$ incident on the end surface of the slab layer 31, light having the wavelength $\lambda 3$ is captured by the point defect 101 in the slab layer 31 and is radiated therefrom, and light having the wavelength $\lambda 4$ is captured by the point defect 103 in the slab layer 31 and is radiated therefrom. Light including the wavelengths $\lambda 1$ and $\lambda 2$, which is not captured in the slab layer 31, passes through the line defect of the slab layer 31 and is then emitted from the end surface thereof to the outside of the optical multiplexing and demultiplexing device 1100.

Next, the light having the wavelength $\lambda 3$ is captured by the point defect 102 in the slab layer 32 and is introduced in the line defect thereof, and in addition, the light having the wavelength $\lambda 4$ is captured by the point defect 104 in the slab layer 32 and is introduced in the line defect thereof. The light having the wavelength $\lambda 3$ and the light having the wavelength $\lambda 4$ pass through the line defect of the slab layer 32 and are then emitted from the end surface of the slab layer 32 to the outside of the optical multiplexing and demultiplexing device 1100.

As described above, according to the optical multiplexing and demultiplexing device 1100 of Modified Example 1 according to this exemplary embodiment, the light including the wavelengths $\lambda 1$ to $\lambda 4$ can be demultiplexed into the light including the wavelengths $\lambda 1$ and $\lambda 2$ and the light including the wavelengths $\lambda 3$ and $\lambda 4$ and can then be emitted. That is, since light including a plurality of wavelengths can be emitted, desired demultiplexed light can be obtained, and the optical multiplexing and demultiplexing device 1100 can be widely used thereby.

In the optical multiplexing and demultiplexing device 1100 described above, the light is not only demultiplexed as described above, but multiplexed light can also be emitted. When a plurality of wavelengths is multiplexed, the light including the wavelengths $\lambda 1$ and $\lambda 2$ is allowed to enter the end surface of the slab layer 31, and the light including the wavelengths $\lambda 3$ and $\lambda 4$ is allowed to enter the end surface of the slab layer 32.

Subsequently, in the slab layer 32, the light including the wavelengths $\lambda 3$ and $\lambda 4$ is captured by the point defects 102 and 104 and is then radiated, and the thus-radiated light including the wavelengths $\lambda 3$ and $\lambda 4$ is introduced into the slab layer 31 from the point defects 101 and 103 through the clad layer 22.

Finally, in the slab layer 31, the multiplexed light including the wavelengths $\lambda 1$ to $\lambda 4$ is obtained and is then output outside.

As described above, according to the optical multiplexing and demultiplexing device 1100 of Modified Example 1 of this exemplary embodiment, the light including the wavelengths $\lambda 1$ and $\lambda 2$ and the light including the wavelengths $\lambda 3$ and $\lambda 4$ can be multiplexed together and can then be emitted outside. That is, according to the optical multiplexing and demultiplexing device 1100, some types of light, each including a plurality of wavelengths, can be multiplexed together so as to obtain a desired multiplexed light, and hence the optical multiplexing and demultiplexing device 1100 can be widely used.

As has thus been described, according to the optical multiplexing and demultiplexing device 1100 of Modified Example 1 of this exemplary embodiment, a compact and highly integrated optical multiplexing and demultiplexing device can be realized in which light can be emitted which is obtained in various manner by demultiplexing light including a plurality of wavelengths or by multiplexing various types of light, having a plurality of wavelengths.

MODIFIED EXAMPLE 2

FIG. 11(B) is a schematic cross-sectional view of an optical multiplexing and demultiplexing device 1200 of Modified Example 2 of this exemplary embodiment according to the present invention. The same reference numerals of the members shown in FIGS. 5(A) and 5(B) designate the members having substantially the same functions as those described above, and detailed descriptions thereof are omitted. In addition, as materials for individual layers and film-forming methods of the optical multiplexing and demultiplexing device 1200, the same materials and methods as those for the optical multiplexing and demultiplexing device 1000 of this exemplary embodiment may be selected.

In the optical multiplexing and demultiplexing device 1200 described above, the structure is formed in which a slab layer 33 and a clad layer 24 are further provided on the optical multiplexing and demultiplexing devices 1000 or 1100. In the slab layer 31, light including wavelengths $\lambda 4$, $\lambda 5$, and $\lambda 6$ can be captured by the point defects 101, 103, and 105 and can then be demultiplexed. In addition, in the slab layer 32, the light including the wavelengths $\lambda 4$, $\lambda 5$, and $\lambda 6$ is captured by the point defects 102, 104, and 106, and light including the wavelengths $\lambda 5$ and $\lambda 6$ can be captured by point defects 107 and 109 and can then be demultiplexed. Furthermore, in the slab layer 33, the light including the wavelengths $\lambda 5$ and $\lambda 6$ is captured by point defects 108 and 110.

In addition, in the optical multiplexing and demultiplexing device 1200, the point defects 101, 103, and 105 in the slab layer 31 are disposed so as to oppose the point defects 102, 104, and 106, respectively, in the slab layer 32. Furthermore, the point defects 107 and 109 in the slab layer 32 are disposed so as to oppose the point defects 108 and 110, respectively, in the slab layer 33.

In the structure described above, when light including the wavelengths $\lambda 1$ to $\lambda 6$ is incident on one end surface of the slab layer 31, in the slab layer 31, the light including the wavelengths $\lambda 4$ to $\lambda 6$ is captured by the point defects 101, 103, and 105 and is then radiated, and light including the wavelengths $\lambda 1$ to $\lambda 3$ is emitted from the other end surface of the slab layer 31. In the slab layer 32, the light including the wavelengths $\lambda 4$ to $\lambda 6$ is introduced into the line defect of the layer by the point defects 102, 104, and 106, the light including the wavelengths $\lambda 5$ and $\lambda 6$ is captured by the point defects 107 and 109 and is then radiated, and light having the wavelength $\lambda 4$ is emitted from the end surface of the slab layer 32. In addition, in the slab layer 33, the light including the wavelengths $\lambda 5$ and $\lambda 6$ is introduced into the line defect of the layer by the point defects 108 and 110 and is then emitted from one end surface.

As described above, according to the optical multiplexing and demultiplexing device 1200 of Modified Example 2 of this exemplary embodiment, the light including the wavelengths $\lambda 1$ to $\lambda 6$ can be demultiplexed into three types of light, including the wavelengths $\lambda 1$ to $\lambda 3$, the wavelength $\lambda 4$, and the wavelengths $\lambda 5$ and $\lambda 6$, and can then be emitted.

In addition to the capability of demultiplexing light as described above, this optical multiplexing and demultiplexing device 1200 can also emit multiplexed light. When a plurality of wavelengths is multiplexed, light including the wavelengths $\lambda 1$ to $\lambda 3$ is allowed to enter the end surface of the slab layer 31, light including the wavelength $\lambda 4$ is allowed to enter the end surface of the slab layer 32, and light including the wavelengths $\lambda 5$ and $\lambda 6$ is allowed to enter the end surface of the slab layer 33.

Then, in the slab layer 33, the light including the wavelengths $\lambda 5$ and $\lambda 6$ is captured by the point defects 108 and 110 and is then radiated. In addition, the light including the wavelengths $\lambda 5$ and $\lambda 6$ thus radiated is introduced into the slab layer 32 from the point defects 107 and 109 through the clad layer 23.

In addition, the light having the wavelength $\lambda 4$, incident on the end surface of the slab layer 32, and the light including the wavelengths $\lambda 5$ and $\lambda 6$, introduced from the point defects 107 and 109, are captured by the point defects 102, 104, and 106 in the slab layer 32 and are then radiated. The light including wavelengths $\lambda 4$ to $\lambda 6$ thus radiated is introduced into the slab layer 31 from the point defects 101, 103, and 105 through the clad layer 22, and the light including the wavelengths $\lambda 1$ to $\lambda 6$ is emitted outside from the end surface of the slab layer 31.

As described above, according to the optical multiplexing and demultiplexing device 1200 of Modified Example 2 of this exemplary embodiment, three types of light, that is, the light including the wavelengths $\lambda 1$ to $\lambda 3$, the light having the wavelength $\lambda 4$, and the light including the wavelengths $\lambda 5$ and $\lambda 6$, can be multiplexed to form the light including the wavelengths $\lambda 1$ to $\lambda 6$ and can then be emitted.

MODIFIED EXAMPLE 3

Figure 12:
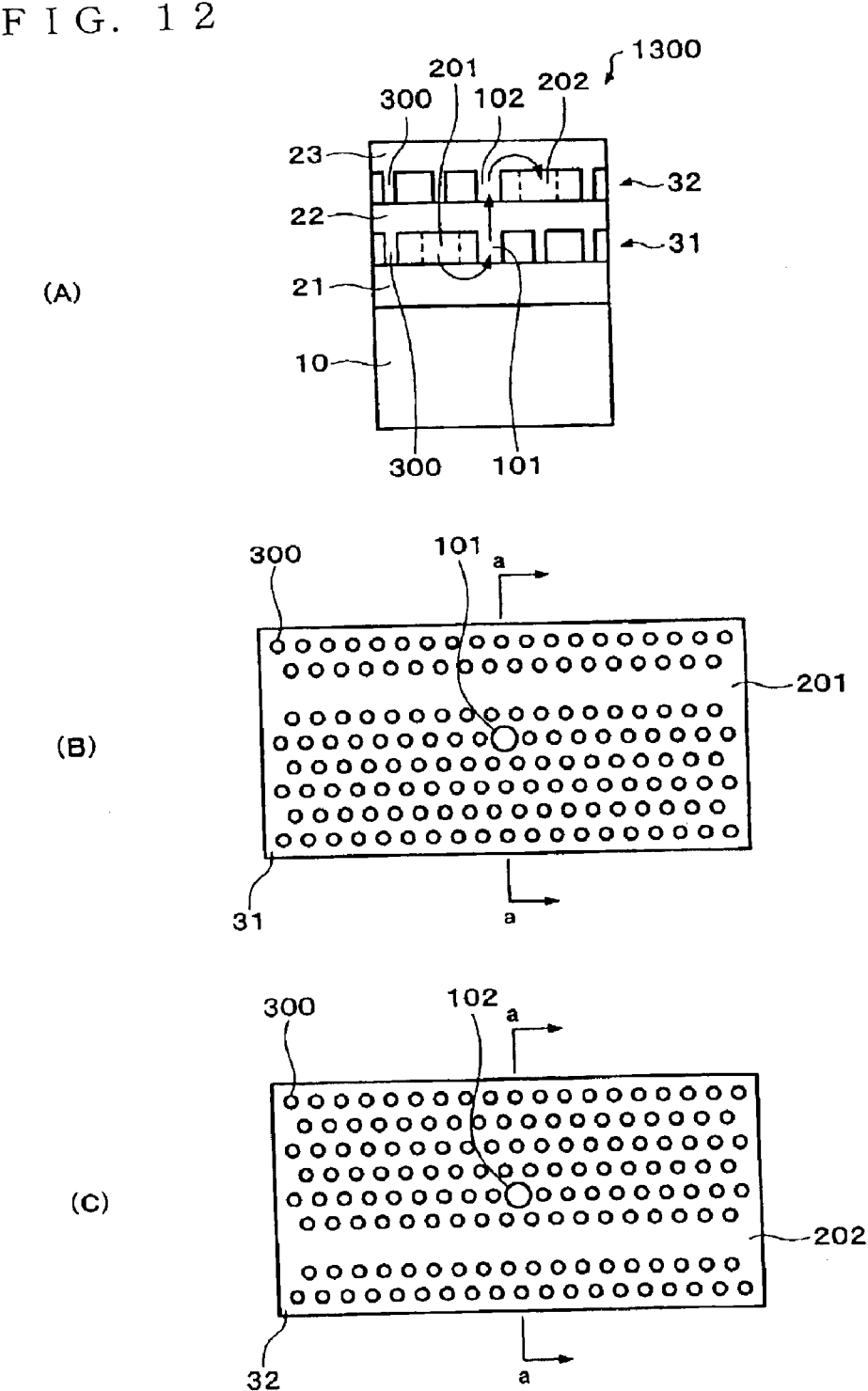
FIGS. 12(A) to 12(C) are schematics each showing an optical multiplexing and demultiplexing device of Modified Example 3 of an exemplary embodiment according to the present invention.

FIGS. 12(A) to 12(C) are schematics of an optical multiplexing and demultiplexing device 1300 of Modified Example 3 of this exemplary embodiment. FIG. 12(A) is a cross-sectional view taken along plane a-a shown in FIGS. 12(B) and 12(C). The same reference numerals of the members shown in FIGS. 5(A) to 9(B) designate the members having substantially the same functions as those described above, and detailed descriptions thereof are omitted. In addition, as materials for individual layers and film-forming methods of the optical multiplexing and demultiplexing device 1300, the same materials and methods as those for the optical multiplexing and demultiplexing device 1000 of this embodiment may be selected.

The optical multiplexing and demultiplexing device 1300 of Modified Example 3 of this exemplary embodiment has the same basic structure as that of the optical multiplexing and demultiplexing device 1000 described above, and the optical demultiplexing function and optical multiplexing function are the same as those described above.

In addition, in the optical multiplexing and demultiplexing device 1300 of Modified Example 3, as is the case of the optical multiplexing and demultiplexing device 1000 of this exemplary embodiment, the point defects 101 and 102, which capture light having the same wavelength, are provided in the slab layers 31 and 32, respectively, so as to oppose each other. However, the line defects 201 and 202 of the slab layers 31 and 32, respectively, are provided so as not to overlap each other. The line defects 201 and 202 function as waveguides through which light passes as described above. In addition, when the distance between waveguides is decreased, light of a specific wavelength may be put in a transition state between the waveguides in some cases. That is, when the distance between the line defects 201 and 202 is decreased, part of transmitted light is leaked from one line defect to the other line defect, and as a result, the interference may occur between the line defects 201 and 202 in some cases.

However, according to the optical multiplexing and demultiplexing device 1300 of this modified example, since the line defects 201 and 202 are disposed so as not to overlap each other while the point defects 101 and 102 are disposed so as to oppose each other, when the device is used, the distance between the slab layers 31 and 32 can be decreased without generating the interference between the line defects 201 and 202 of the slab layers 31 and 32, and hence further integration and miniaturization of the optical multiplexing and demultiplexing device can be realized.

In addition, in the optical multiplexing and demultiplexing device 1300 of this modified example, the line defect 201 and 202 may be disposed in parallel with each other or may also be disposed perpendicular to each other.

In the optical multiplexing and demultiplexing device 1300 of Modified Example 3, as is the case of the optical multiplexing and demultiplexing device 1100 of Modified Example 1 described above, demultiplexing of light including a plurality of wavelengths and multiplexing of at least two types of light including different wavelengths can be performed by providing a plurality of point defects in the individual slab layers 31 and 32, and as is the case of the optical multiplexing and demultiplexing device 1200 of Modified Example 2, the structure including at least three slab layers can also be formed.

MODIFIED EXAMPLE 4

Figure 13:
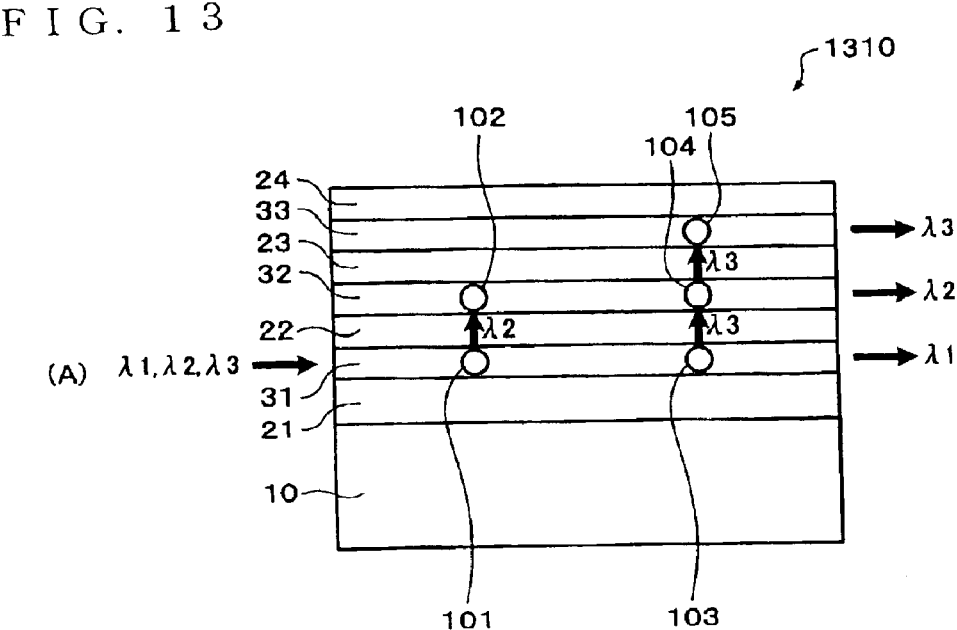
FIGS. 13(A) and 13(B) are schematics each showing an optical multiplexing and demultiplexing device of Modified Example 4 of an exemplary embodiment according to the present invention.
Figure 13:
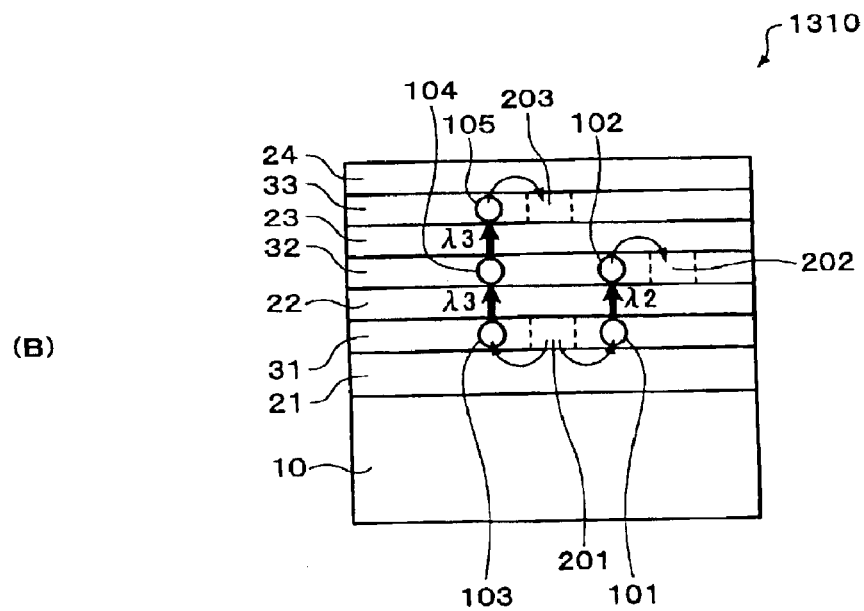

FIGS. 13(A) and 13(B) are schematics of an optical multiplexing and demultiplexing device 1310 of Modified Example 4 of the present invention. The same reference numerals of the members shown in FIGS. 12(A) to 12(C) designate the members having substantially the same functions as those described above, and detailed descriptions thereof are omitted. In addition, as materials for individual layers and film-forming methods of the optical multiplexing and demultiplexing device 1310, the same materials and methods as those for the optical multiplexing and demultiplexing device 1000 of this exemplary embodiment may be selected.

The optical multiplexing and demultiplexing device 1310 has substantially the same optical multiplexing and demultiplexing functions as those of the optical multiplexing and demultiplexing devices described above. That is, as shown in FIG. 13(A), when light including the wavelengths λ1 to λ3 enters, light having the wavelength λ1 is demultiplexed therefrom and then emitted from the slab layer 31. In addition, light having the wavelength λ2 is demultiplexed and then emitted from the slab layer 32, and light having the wavelength λ3 is demultiplexed and then emitted from the slab layer 33.

In addition, in this optical multiplexing and demultiplexing device 1310, the light having the wavelength λ3, which is to be emitted from the slab layer 33, is not introduced into the line defect of the slab layer 32 and is introduced into the line defect of the slab layer 33.

As the particular structure in which the light having the wavelength λ3, which is to be emitted from the slab layer 33, is not introduced into the line defect of the slab layer 32 and is introduced into the line defect of the slab layer 33, as described above, the following structure may be described by way of example. FIG. 13(B) is a schematic cross-sectional view of the optical multiplexing and demultiplexing device 1310 when viewed in the light incident and emission direction. As shown in FIG. 13(B), the line defects 201 and 202 of the slab layer 31 and 32, respectively, are disposed so as not to overlap each other, and the line defect 202 and a line defect 203 of the slab layer 32 and the slab layer 33, respectively, are disposed so as not to overlap each other.

In addition, in the slab layer 31, the point defect 101 capturing the light having the wavelength λ2 and the point defect 103 capturing light having the wavelength λ3 are disposed at different sides of the line defect 201 which is located at the center therebetween. In addition, in the slab layer 32, the line defect 202 is disposed so as not to overlap the line defect 201 of the slab layer 31, and the point defect 102 for introducing the light having the wavelength λ2 into the line defect 202 is disposed in the vicinity thereof. Furthermore, in the slab layer 32, the point defect 104 capturing the light having the wavelength λ3 is disposed at a distance from the line defect 202.

In this example, according to the relationship between the point defect and the line defect, the coupling efficiency of light can be determined by the distance between the point defect and the line defect. That is, as the distance between the point defect and the line defect is increased, light captured by the point defect becomes unlikely to be introduced into the line defect.

Accordingly, in the slab layer 32 of the optical multiplexing and demultiplexing device 1310 of this modified example, as shown in FIG. 13(B), since the point defect 104 capturing the light having the wavelength λ3 is disposed at a position sufficiently far from that of the line defect 202, the light having the wavelength λ3 captured by the point defect 104 is not introduced into the line defect 202 and is radiated from the slab layer 32. Next, the light having the wavelength λ3 radiated from the point defect 104 in the slab layer 32 is finally introduced into the line defect 203 from the point defect 105 in the slab layer 33 and is then emitted outside.

As described above, according to the optical multiplexing and demultiplexing device 1310 of this modified example, compared to the case in which light is once introduced into the point defect of each slab layer, the number of the point defects disposed in the individual slab layers can be decreased.

MODIFIED EXAMPLE 5

Figure 14:
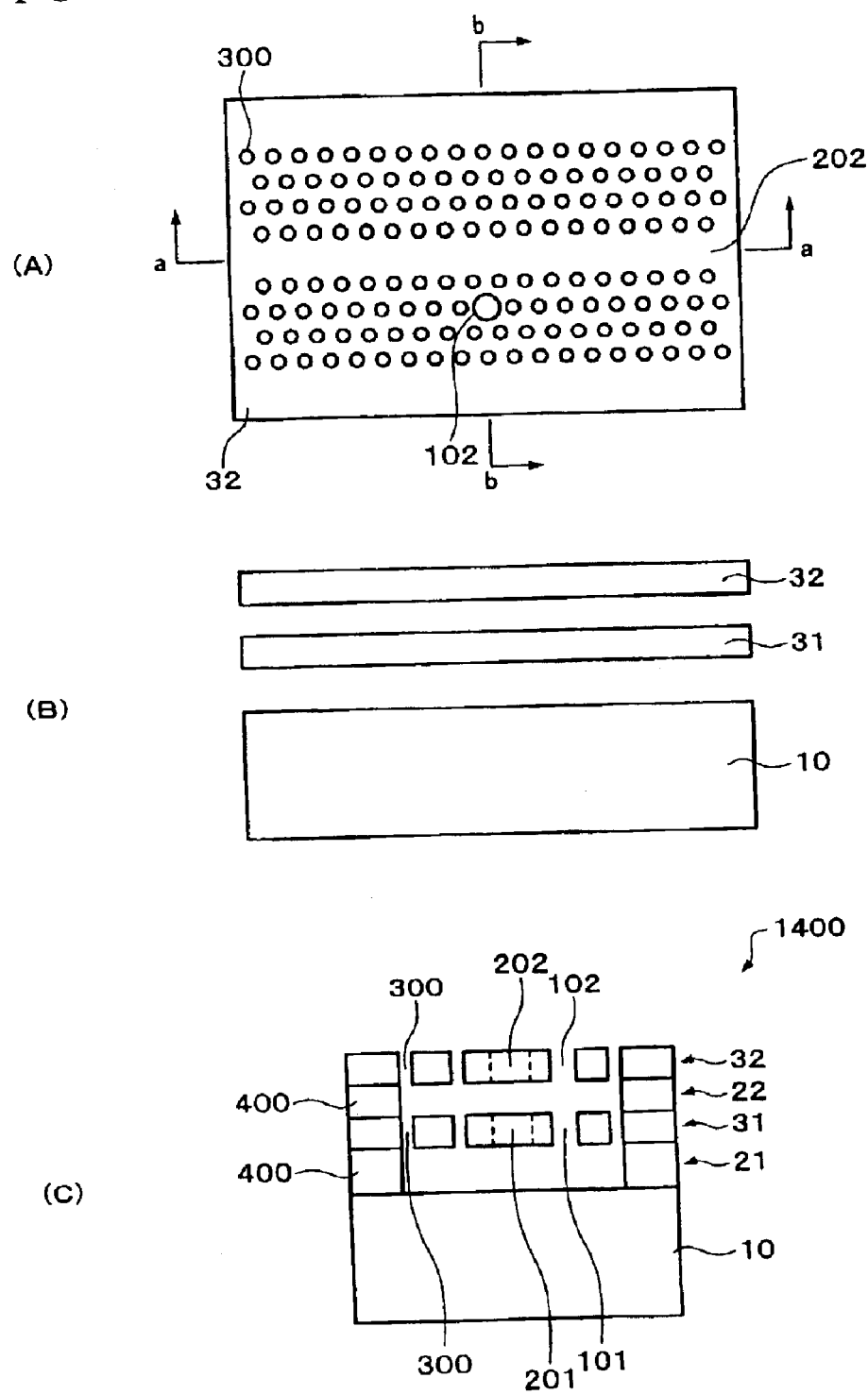
FIGS. 14(A) to 14(C) are schematics each showing an optical multiplexing and demultiplexing device of Modified Example 5 of an exemplary embodiment according to the present invention.

FIGS. 14(A) to 14(C) are schematics of an optical multiplexing and demultiplexing device 1400 of Modified Example 5 of this exemplary embodiment. FIG. 14(B) is a cross-sectional view taken along plane a-a shown in FIG. 14(A). FIG. 14(C) is a cross-sectional view taken along plane b-b shown in FIG. 14(A). The same reference numerals of the members shown in FIGS. 5(A) to 9(B) designate the members having substantially the same functions as those described above, and detailed descriptions thereof are omitted. In addition, as materials for individual layers of the optical multiplexing and demultiplexing device 1400, the same materials as those for the optical multiplexing and demultiplexing device 1000 of this exemplary embodiment may be selected.

This optical multiplexing and demultiplexing device 1400 has the same basic structure as that of the optical multiplexing and demultiplexing device 1000. However, as shown in FIGS. 14(B) and 14(C), a hollow structure in which the clad layers 21 and 22 are formed of air is used.

In this optical multiplexing and demultiplexing device 1400, the slab layers 31 and 32 are supported by support layers 400 so as to form a multilayer structure. As a material for the support layer 400, a preferable material may be selected from inorganic and organic materials.

In addition, the optical multiplexing and demultiplexing device 1400 of this modified example can perform multiplexing and demultiplexing of light as is the optical multiplexing and demultiplexing device 1000 of the exemplary embodiment described above. In this example, since the optical multiplexing and demultiplexing device 1400 uses air for forming the clad layers 21 and 22, the refractive indexes thereof do not depend on the manufacturing process or the like, and hence stable refractive indexes can be obtained.

In addition, in manufacturing the optical multiplexing and demultiplexing device 1400, after being separately formed, the slab layers 31 and 32 can be laminated to each other above the substrate 10 with the support layers 400 provided therebetween.

Figure 15:
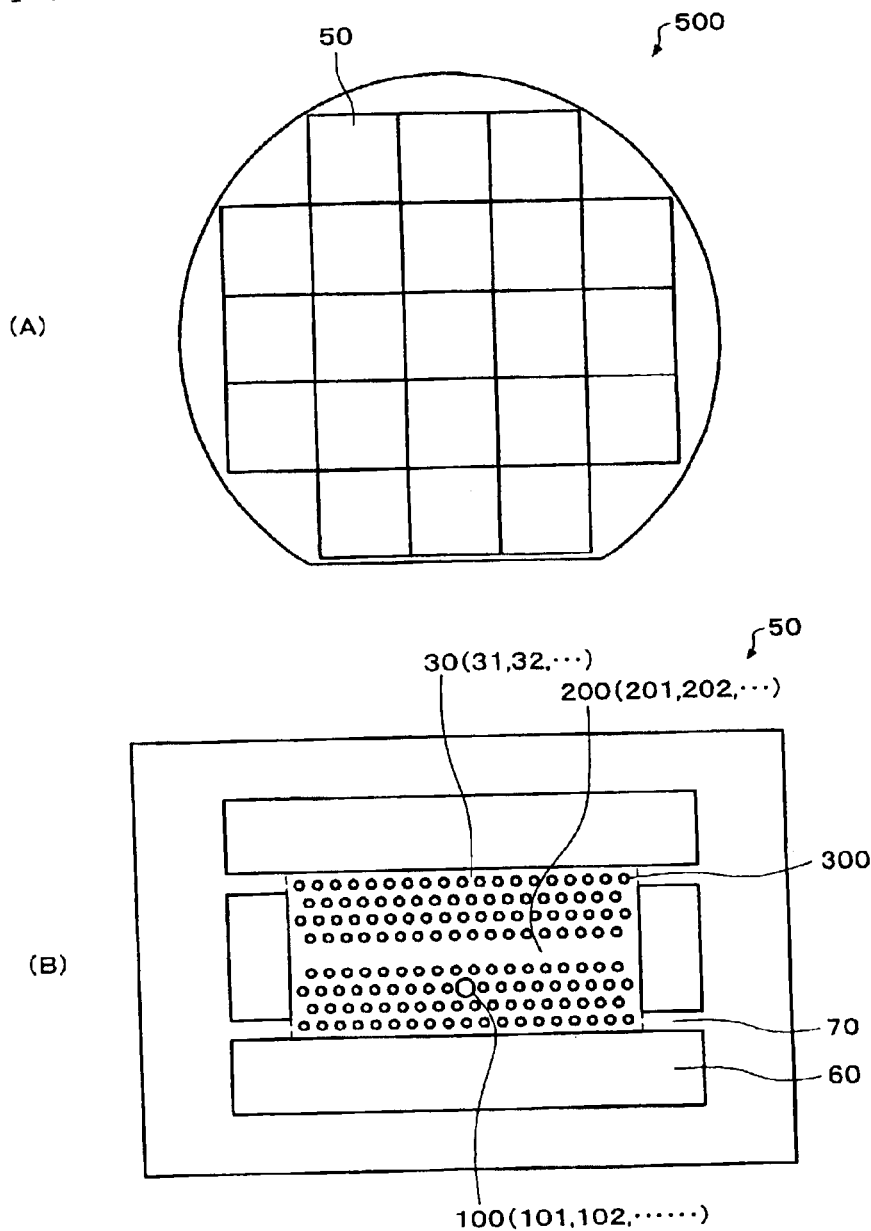
FIGS. 15(A) and 15(B) are schematics each illustrating one manufacturing step of an optical multiplexing and demultiplexing device of Modified Example 5 of an exemplary embodiment according to the present invention.

In particular, as shown in FIG. 15(A), for example, a Si single crystal wafer 500 is prepared. Next, as shown in FIG. 15(B), in a predetermined region 50 of the wafer 500, the low refractive index regions 300 and the point defects 101 and 102 are patterned by an electron beam lithography method using EBs (electron beams), a photolithography technique using RIE (reactive ion etching) or the like. In this step, around each of regions in which the slab layers 31 and 32 are to be formed, for example, a pattern 60 for separation may be formed so as to be in conformity with the shape of each of the slab layers 31 and 32 as shown in FIG. 15(B). In the case in which the pattern 60 for separation is formed around each of the regions in which the slab layers 31 and 32 are to be formed, a support region 70 supporting each of the slab layers 31 and 32 is preferably allowed to remain so that the slab layers 31 and 32 are not separated from the wafer 500 during patterning.

Next, each of the slab layers 31 and 32 is separated from the patterned wafer 500 at the support region 70 (dotted line portion in the figure) by cleavage or the like, thereby obtaining the slab layers 31 and 32. In addition, when the pattern 60 for separation is not formed around the each of the regions in which the slab layers 31 and 32 are to be formed, the slab layers 31 and 32 may be obtained by dicing the wafer 500 using a related art, later developed, or known method.

MODIFIED EXAMPLE 6

Figure 16:
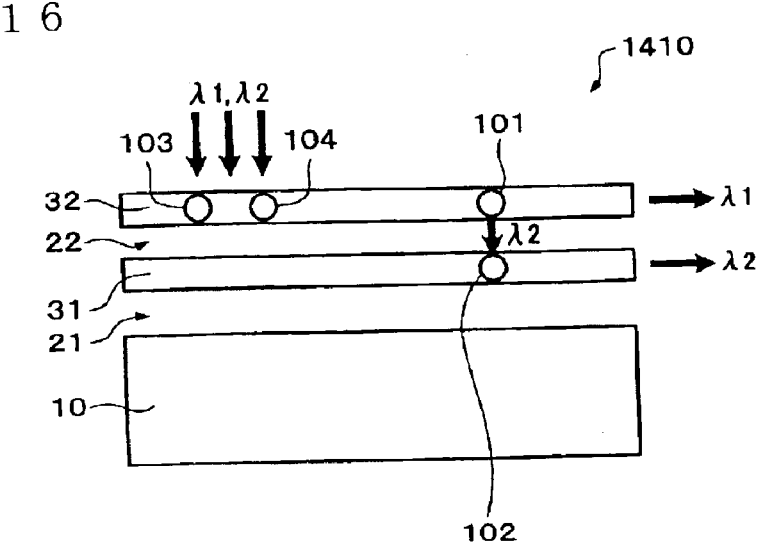
FIG. 16 is a schematic showing an optical multiplexing and demultiplexing device of Modified Example 6 of an exemplary embodiment according to the present invention.

FIG. 16 is a schematic cross-sectional view of an optical multiplexing and demultiplexing device 1410 of Modified Example 6 of this exemplary embodiment. The same reference numerals of the members shown in FIGS. 14(A) to 14(C) designate the members having substantially the same functions as those described above, and detailed descriptions thereof are omitted.

This optical multiplexing and demultiplexing device 1410 has the same basic structure as that of the optical multiplexing and demultiplexing device 1400 of Modified Example 5 of this exemplary embodiment. However, the structure in which the point defects 103 and 104 are formed in the slab layer 32 for receiving light is different from that of the optical multiplexing and demultiplexing device 1400.

In this optical multiplexing and demultiplexing device 1410, since the hollow structure in which air is used for the clad layers 21 and 22 is formed as is the optical multiplexing and demultiplexing device 1400 of Modified Example 5 described above, light can enter the topmost layer, that is, the slab layer 32, through the surface thereof. That is, in the optical multiplexing and demultiplexing device 1410, light including wavelengths $\lambda 1$ and $\lambda 2$, incident from the upper side of the slab layer 32, is captured by the point defects 103 and 104 and is then introduced into the slab layer 32, and light having the wavelength $\lambda 1$ passes through the line defect of the slab layer 32 and is then emitted outside from the end surface thereof. On the other hand, after being introduced into the line defect of the slab layer 32, light having the wavelength $\lambda 2$ is captured by the point defect 101 of the slab layer 32, is then captured by the point defect 102 of the slab layer 31 through the clad layer 22, and is introduced into the slab layer 31. Subsequently, the light having the wavelength $\lambda 2$ passes through the line defect of the slab layer 31 and is emitted outside from the end surface thereof.

As described above, according to the optical multiplexing and demultiplexing device 1410 of this modified example, since the light including a plurality of the wavelengths $\lambda 1$ and $\lambda 2$ is allowed to enter the point defects 103 and 104 provided in the slab layer 32, the light can enter the slab layer 32 through the surface thereof. Hence, according to the optical multiplexing and demultiplexing device 1410, even when the spot diameter of incident light is large as compared to the case in which light is incident on the end surface of the slab layer, the light can be efficiently received.

In addition, in the first exemplary embodiment and the modified examples described above, the number of light wavelengths $\lambda$ and combination thereof relating to the optical multiplexing and demultiplexing can be optionally selected.

[Second Exemplary Embodiment]

The optical multiplexing and demultiplexing device 1000 of the first exemplary embodiment, and the optical multiplexing and demultiplexing devices 1100, 1200, 1300, 1310, 1400, and 1410 of Modified Examples 1 to 6 maybe applied to various optical communication apparatuses such as an optical router or an optical switcher (not shown in the figure).

Figure 17:
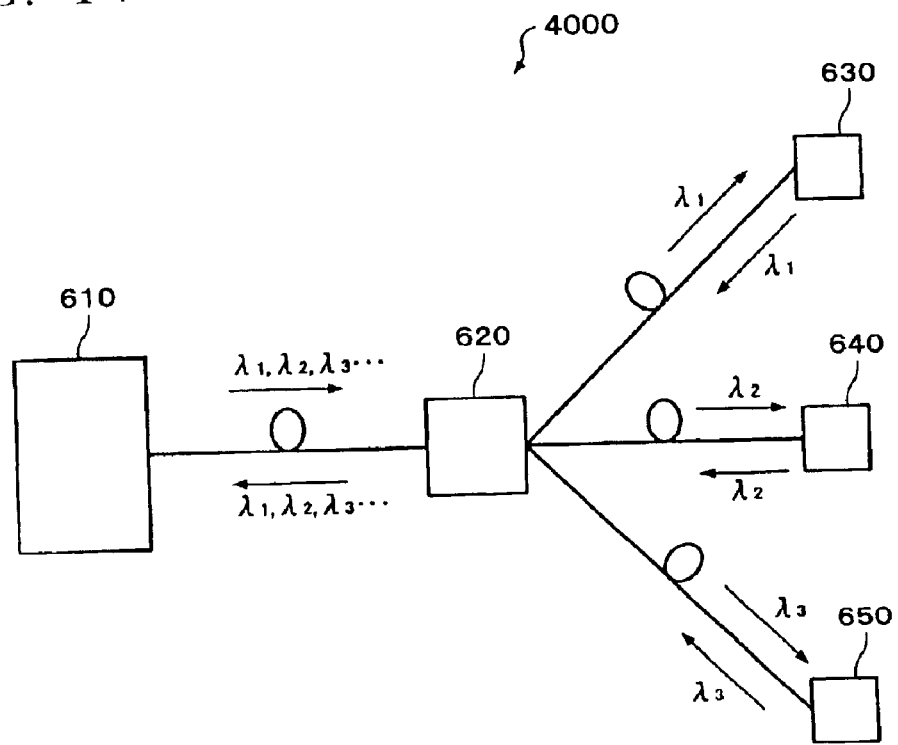
FIG. 17 is a schematic showing an optical communication system according to the second exemplary embodiment from the topmost layer, that is, from the slab layer 32.

In addition, the optical multiplexing and demultiplexing devices 1000 to 1410 described above can be applied to an optical communication system 4000 as shown in FIG. 17. The optical communication system 4000 is an optical communication system using a wavelength division multiplexing (WDM) system in which light signals including a plurality of wavelengths are multiplexed and transmitted, and which is composed, for example, of a base station 610, a relay station 620, and subscriber terminals 630 to 650. The base station 610, the relay station 620, and the subscriber terminals 630 to 650 are connected to each other with optical fibers.

The base station 610 can transmit and receive an optical signal including a plurality of wavelengths ($\lambda 1, \lambda 2, \lambda 3, \ldots$). In the relay station 620, the optical signal transmitted from the base station 610 can be demultiplexed and then transmitted to the subscriber terminals 630 to 650. In addition, in the relay station 620, optical signals received from the subscriber terminals 630 to 650 can be multiplexed and transmitted to the base station 610. In addition, the subscriber terminals 630 to 650 are constructed so that optical signals in an allocated wavelength band can be transmitted and received. In particular, an optical signal having the wavelength $\lambda 1$ is transmitted and received at the subscriber terminal 630, an optical signal having the wavelength $\lambda 2$ is transmitted and received at the subscriber terminal 640, and an optical signal having the wavelength $\lambda 3$ is transmitted and received at the subscriber terminal 650, thereby performing data communication.

In the case described above, the optical multiplexing and demultiplexing devices 1000 to 1410 of the first exemplary embodiment can be used in an optical communication apparatus (not shown in the figure) installed in the base station 610 or the relay station 620, and multiplexing and demultiplexing of optical signals are performed.

As described above, according to the optical communication system 4000 described above, various communication systems can be constructed from a relatively large-scale communication system, that is, a so-called fiber to the home system (FTTH) in which communication pathways from the base station 610 to the subscriber terminals 630 to 650 are unified with optical fibers, to a relatively small-scale communication system, such as an optical LAN.

The exemplary embodiments of the present invention are not limited to those described above, and various modifications may be carried out without departing from the scope of the present invention.

What is claimed is:

1. An optical multiplexing and demultiplexing device, comprising:

a substrate; and a plurality of slab layers provided on the substrate, each of the slab layers having a two-dimensional photonic crystal structure, in which low refractive index regions are periodically arranged, and including a line defect functioning as a waveguide formed in part of the periodical arrangement and at least one point defect formed in the periodic arrangement, in which the point defect captures light having a specific wavelength and introduces the light into the line defect, or captures light having a specific wavelength from the line defect and radiates the light, and the point defects formed in at least two of the slab layers, which capture light having the same wavelength, being disposed so as to oppose each other.

2. The optical multiplexing and demultiplexing device according to claim 1, the specific wavelength of the light captured by the point defect changing in accordance with the change in shape thereof.

3. The optical multiplexing and demultiplexing device according to claim 1, the point defect having a columnar structure asymmetric in the longitudinal direction.

4. The optical multiplexing and demultiplexing device according to claim 1, further comprising a reflection member disposed at one side of the point defect to reflect the light having the specific wavelength to a surface of one of the slab layers.

5. The optical multiplexing and demultiplexing device according to claim 1, further comprising clad layers provided on the top and the bottom of each of the slab layers, the clad layers having a refractive index lower than that of the slab layers.

6. The optical multiplexing and demultiplexing device according to claim 1, further comprising support layers provided between the slab layers and between the substrate and one of the slab layers.

7. The optical multiplexing and demultiplexing device according to claim 1, the line defect being closed at one end thereof by the periodic arrangement of the low refractive index regions.

8. The optical multiplexing and demultiplexing device according to claim 1, one of the line defects, which is provided on one of the slab layers, being disposed so as not to overlap another one of the line defects, which is provided on at least one of the slab layers disposed above and below the one of the slab layers.

9. The optical multiplexing and demultiplexing device according to claim 1, the periodic arrangement being at least one of a triangular lattice arrangement and a square lattice arrangement.

10. The optical multiplexing and demultiplexing device according to claim 1, the low refractive regions being at least one of grooves and through-holes formed in each of the slab layers.

11. An optical communication apparatus, comprising:

the optical multiplexing and demultiplexing device according to claim 1.

* * * * *